US009459853B2

(12) United States Patent
Ou et al.

(10) Patent No.: US 9,459,853 B2
(45) Date of Patent: *Oct. 4, 2016

(54) METHOD AND SYSTEM FOR INTELLIGENT INSTALLATION/UPGRADING OF SOFTWARE

(75) Inventors: Sheng Ou, Beijing (CN); Lixin Wan, Beijing (CN)

(73) Assignee: BEIJING QIHOO TECHNOLOGY COMPANY LIMITED (CN)

( * ) Notice: Subject to any disclaimer, the term of this patent is extended or adjusted under 35 U.S.C. 154(b) by 53 days.

This patent is subject to a terminal disclaimer.

(21) Appl. No.: 13/885,763

(22) PCT Filed: Nov. 17, 2011

(86) PCT No.: PCT/CN2011/082355
§ 371 (c)(1),
(2), (4) Date: Jul. 18, 2013

(87) PCT Pub. No.: WO2012/065562
PCT Pub. Date: May 24, 2012

(65) Prior Publication Data
US 2013/0298116 A1  Nov. 7, 2013

(30) Foreign Application Priority Data

Nov. 19, 2010 (CN) .......................... 2010 1 0552537

(51) Int. Cl.
*G06F 9/445* (2006.01)
(52) U.S. Cl.
CPC .. *G06F 8/61* (2013.01); *G06F 8/65* (2013.01)
(58) Field of Classification Search
USPC ................................................ 717/168–178
See application file for complete search history.

(56) References Cited

U.S. PATENT DOCUMENTS 5,835,777 A * 11/1998 Staelin .......................... 717/175
6,151,643 A * 11/2000 Cheng et al. .................. 710/36

(Continued)

OTHER PUBLICATIONS

Nishant. "Running Your Apps on a Hidden Desktop." Wordpress. N.p., Aug. 9, 2004. Web. Aug. 22, 2014. <http://voidnish.wordpress.com/2004/08/09/running-your-apps-on-a-hidden-desktop/>.*

(Continued)

*Primary Examiner* — Wei Zhen
*Assistant Examiner* — Binh Luu
(74) *Attorney, Agent, or Firm* — Troutman Sanders LLP

(57) ABSTRACT

The present provides a method and system for intelligent installation/upgrading of software. Said method first detects, at a client, softwares that have been installed on the client, generates a list of softwares to be installed/upgraded, and provides a corresponding installation/upgrading prompt for each software to be installed/upgraded; then, upon detecting, by the client, that a user selects an installation/upgrading operation of a software according to said installation/upgrading prompt, it downloads a corresponding target software installation/upgrading package from a server according to a name and version number of said software to be installed/upgraded; next, it runs an installation/upgrading file in said target software installation/upgrading package at the client to finish installation/upgrading of said software. The present invention makes the user no longer need to worry about the irrelevant and harmful contents bound to the software to be installed, so it can realize convenient installation, meanwhile, it can enable the user to learn about new versions of softwares installed in the client in time and can upgrade several softwares at one time.

13 Claims, 4 Drawing Sheets

(56) References Cited

U.S. PATENT DOCUMENTS

| | | | |
|---|---|---|---|
| 6,789,215 B1* | 9/2004 | Rupp et al. | 714/38.14 |
| 7,398,524 B2* | 7/2008 | Shapiro | 717/175 |
| 7,584,467 B2* | 9/2009 | Wickham et al. | 717/171 |
| 8,151,355 B2* | 4/2012 | Fossen et al. | 726/24 |
| 2003/0110482 A1* | 6/2003 | Ferguson et al. | 717/168 |
| 2004/0188511 A1* | 9/2004 | Sprigg | G06F 8/60 235/375 |
| 2005/0155031 A1* | 7/2005 | Wang et al. | 717/170 |
| 2005/0172284 A1* | 8/2005 | Dandekar et al. | 717/175 |
| 2006/0206888 A1* | 9/2006 | Mavrinac et al. | 717/168 |
| 2007/0277167 A1* | 11/2007 | Smith et al. | 717/168 |
| 2010/0024036 A1* | 1/2010 | Morozov et al. | 726/26 |
| 2010/0083246 A1* | 4/2010 | Mincarelli et al. | 717/178 |
| 2012/0246630 A1* | 9/2012 | Kuzins et al. | 717/169 |

OTHER PUBLICATIONS

"Remove Junk and Unwanted Software from PC with PC De-Crapifier." My Digital Life. N.p., Aug. 22, 2006. Web. Sep. 13, 2014. <http://www.mydigitallife.info/remove-junk-and-unwanted-software-from-pc-with-pc-de-crapifier/>.*

"19 Tools to Get the Junk Off Your PC." PC World. N.p., Aug. 27, 2007. Web. Sep. 13, 2014. <http://www.pcworld.com/article/136109/article.html?page=0>.*

"The PDF Creator (Printer Driver) Installation." EJustice Solutions. N.p., Aug. 28, 2010. Web. Jun. 16, 2015. <http://www.ejusticesolutions.com/ejs_onsite/Install_PDF_Creator.htm>.*

* cited by examiner

```
┌─────────────────────────────────────────────────────────────┐
│ storing, periodically updating a pre-set software list which includes │─ 201
│ software names and version numbers, and issuing said pre-set │
│ software list to the client by the server │
└─────────────────────────────────────────────────────────────┘
                              │
                              ▼
┌─────────────────────────────────────────────────────────────┐
│ detecting by the client whether the client has the corresponding │─ 202
│ software to be installed according to information of said list │
└─────────────────────────────────────────────────────────────┘
                              │
                              ▼
┌─────────────────────────────────────────────────────────────┐
│ generating a list of softwares to be installed according to the result of │─ 203
│ detection │
└─────────────────────────────────────────────────────────────┘
```

Figure 2

```
┌─────────────────────────────────────────────────────────────┐
│ detecting, by the client, names and version numbers of all softwares │─ 301
│ to be installed/upgraded in the client and transmitting them to the │
│ server │
└─────────────────────────────────────────────────────────────┘
                              │
                              ▼
┌─────────────────────────────────────────────────────────────┐
│ comparing, by the server, the names and version numbers of │─ 302
│ softwares to be installed/upgraded transmitted from the client with │
│ the software names and version numbers stored in the database to │
│ determine manageable software names and version numbers │
└─────────────────────────────────────────────────────────────┘
                              │
                              ▼
┌─────────────────────────────────────────────────────────────┐
│ generating, by the client, a list of softwares to be installed/upgraded │─ 303
│ according to said manageable software names and version numbers │
└─────────────────────────────────────────────────────────────┘
```

Figure 3

501 issuing unit — server
502 detecting unit — client
503 generating unit — client

Figure 5

601 detecting unit — client
602 comparing unit — server
603 generating unit — client

Figure 6

METHOD AND SYSTEM FOR INTELLIGENT INSTALLATION/UPGRADING OF SOFTWARE

This application claims priority to PCT/CN2011/082355 filed Nov. 17, 2011 and to Chinese Appl. No. 201010552537.0 filed Nov. 19, 2010.

FIELD OF THE INVENTION

The present invention relates to the technical field of software, in particular to a method and system for intelligent installation/upgrading of software.

BACKGROUND OF THE INVENTION

With the development of the computer and Internet technology, various application softwares emerge in an endless stream. The only single purpose of early software installation is to install functional modules relating to the software, but with the development of competition, nowadays some irrelevant and even harmful contents will be bound to the software during installation of the software, which are installed by the user unintentionally during installation of the software.

This kind of problem is now becoming more and more serious, because not only a lot of officially released softwares include a great deal of bound contents, some people who specially provide software download will also integrate bound contents into the normal software installation process of others, thus a lot of trouble are caused to users.

Some inexperienced users will usually install many unneeded bound contents unintentionally during installation, and these bound contents might very possibly be harmful; as for users with some experience, they need to be very careful during the installation, and when they noticed some of the irrelevant bound contents, they may choose to remove them, but this delays the process of installation and wastes a lot of energy of users, besides, with respect to some hidden or forcibly bound contents, there is nothing the users could do.

On the other hand, software upgrading is similar to software installation, because there is a process of installation after upgrading. The difference is that when a new version of a software is released, it is usually published on a web page of its own official web site or on web pages of cooperating web sites, or it is advertised to computer users. After learning information of the new version, users may choose whether to download it or not and where to download it according to the needs. This way of application software upgrading is passive upgrading, and for users, they cannot learn the release of new versions in time.

There are some softwares that have an update informing function, but this function is only effective to said softwares themselves, while as for other softwares, this function cannot have the effect of prompting, so users still cannot learn in time whether the commonly used softwares installed are the latest versions; moreover, when upgraded versions have been released for several softwares, it is impossible to upgrade all the new versions at one time.

Therefore, it is a problem demanding prompt solution as to how to provide a method and system for intelligent installation/upgrading of software, which enable users to confidently install various softwares without paying much attention to the installation process or which even enables an intervention-free installation or upgrading.

SUMMARY OF THE INVENTION

The technical problem to be solved by the present invention is to provide a method and system for intelligent installation/upgrading of software, which enables users not to worry about the irrelevant or harmful contents bound to the software to be installed so as to realize convenient and fast installation, and which can enable users to learn about new versions of the installed softwares in time and to upgrade several softwares at one time.

To solve the above technical problem, the present invention provides a method for intelligent installation/upgrading of software, which comprises the following steps:

detecting, at a client, softwares that have been installed on the client, generating a list of softwares to be installed/upgraded, and providing a corresponding installation/upgrading prompt for each software to be installed/upgraded;

upon detecting, by the client, that a user selects an installation/upgrading operation of a software according to said installation/upgrading prompt, downloading a corresponding target software installation/upgrading package from a server according to a name and version number of said software to be installed/upgraded;

running an installation/upgrading file in said target software installation/upgrading package at the client to finish installation/upgrading of said software.

The present invention also provides a system for intelligent installation/upgrading of software, which comprises:

a detecting module adapted to detecting, at a client, softwares that have been installed on the client, generating a list of softwares to be installed/upgraded, and providing a corresponding installation/upgrading prompt for each software to be installed/upgraded;

a downloading module adapted to, upon detecting by the client that a user selects an installation/upgrading operation of a software according to said installation/upgrading prompt, downloading a corresponding target software installation/upgrading package from a server according to a name and version number of said software to be installed/upgraded;

an installing module adapted to running an installation/upgrading file in said target software installation/upgrading package at the client to finish installation/upgrading of said software.

The present invention not only provides a function of "one-click installation/upgrading" to users, but also makes the installation/upgrading process free of bound contents, so there is no more worry for unintentional installation of harmful contents during the installation and software installation/upgrading becomes easy, simple and green. In addition, the present invention can detect software installation information intelligently, efficiently and accurately, determine the software versions precisely, and push software upgrading information to a user's desktop according to software upgrading frequency of the user.

BRIEF DESCRIPTION OF THE DRAWINGS

FIG. 2 is a schematic drawing of a flow of steps of detecting by a client according to an embodiment of the present invention.

FIG. 3 is a schematic drawing of a flow of steps of detecting by a client according to another embodiment of the present invention.

FIG. 5 is a schematic drawing of a detecting module according to an embodiment of the present invention.

FIG. 6 is a schematic drawing of a detecting module according to another embodiment of the present invention.

DETAILED DESCRIPTION OF THE INVENTION

Embodiments of the present invention are described in detail below with reference to the drawings.

Figure 1:
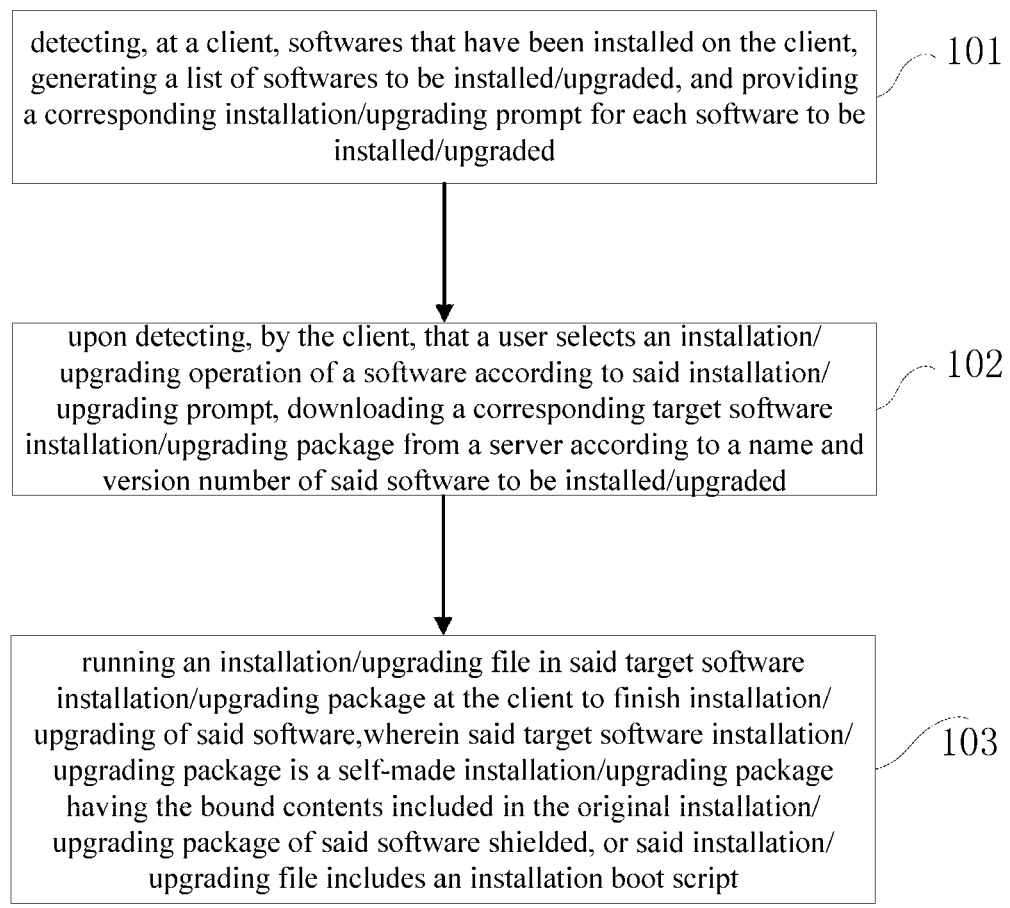
FIG. 1 is a flow chart of a method for intelligent installation/upgrading of software according to an embodiment of the present invention.

FIG. 1 is a flow chart of a method for intelligent installation/upgrading of software according to an embodiment of the present invention. First, detecting, at a client, softwares that have been installed on the client, generating a list of softwares to be installed/upgraded, and providing a corresponding installation/upgrading prompt for each software to be installed/upgraded (step 101); then, upon detecting, by the client, that a user selects an installation/upgrading operation of a software according to said installation/upgrading prompt, downloading a corresponding target software installation/upgrading package from a server according to a name and version number of said software to be installed/upgraded (step 102); next, running an installation/upgrading file in said target software installation/upgrading package at the client to finish installation/upgrading of said software.

Wherein, the step of detecting, at a client, softwares that have been installed on the client may be performing corresponding detections according to a pre-set software list; said pre-set software list includes software names, and when the client detects that a software is not installed on the client, it prompts the user to download and install said software.

Wherein, said pre-set software list may further include software version numbers, when the client detects that a version number of a corresponding software installed on the client is lower than that in said list, it prompts the user to download the upgraded version.

Wherein, said pre-set software list may be stored in the client or it may be stored in the server and updated periodically to be issued to the client.

Wherein, in addition to running an installation upgrading package or installation upgrading file originally configured in the software, said target software installation/upgrading package may also be a self-made installation/upgrading package having the bound contents included in the original installation/upgrading package of said software shielded.

Wherein, the installation/upgrading file of said target software installation/upgrading package may include an installation boot script which shields bound contents.

Wherein, said installation boot script may shield bound contents by selecting and setting installation parameters.

Wherein, the installation/upgrading file of said target software installation/upgrading package may include an installation boot script which includes a step of deleting specific bound files and/or recovering environment setting modified by said bound files after finishing the installation/upgrading.

Wherein, the installation/upgrading file of said target software installation/upgrading package may include an installation boot script which includes a step of replacing or adding upgrading files and/or setting the registration environment.

Wherein, the installation/upgrading file of said target software installation/upgrading package may include an installation boot script which includes quiesce installation parameters to perform installation/upgrading in a quiesce mode.

Wherein, the installation/upgrading file of said target software installation/upgrading package may include an installation boot script which includes creating a virtual desktop and performing the step of installation/upgrading on the virtual desktop.

The bound contents that might exist in the software installation/upgrading package may be obtained through analysis of the software installation process, while as for measures for shielding said bound contents, they may be taken by cooperating with provider of said software.

For example, by simulating the actual installation, it may be observed whether the whole installation process requires the user to click to select, whether bound contents are carried secretly, and whether said bound contents are information that are clicked and selected by the user, then a corresponding installation boot script may be written and provided in advance according to these information, so that in the process of executing the script, some steps of selection for installation may be skipped, i.e. it is selected not to install the bound contents; as for bound contents that are forcibly installed without being selected by the user, they may be un-installed after finishing the installation, or the installation process of said bound contents may be terminated, or the bound contents in the installation file are directly deleted, or even the installation package may be re-made.

In the above-mentioned script, skipping the installation selection may be realized by quiesce installation parameters or virtual clicking. For example, with respect to the software "Storm Codec", it may be realized by the following quiesce parameters: StormCodec.exe_/S/quickasso_/skipcheck_/skipyisou_/2052.

wherein, /S means quiesce installation (the user interface is not displayed, and if there is no other parameter, default components are installed according to a default setting and in a default language of the system);

/quickasso means directly associating files according to recommendation/current format after finishing the installation without any dialog box for selection popping out;

/skipcheck means skipping examination of the operating environment during installation;

/skipyisou means skipping installation of the Internet tool bar of Yisou of Yahoo;

/2052 means not inquiring the language to be installed and directly installing a simplified Chinese version.

In addition, a virtual desktop installation may be created, and installation on a virtual desktop can more thoroughly prevent the user from being disturbed, and any operation of the user on the present desktop will not be interrupted. Said virtual desktop may be realized mainly through API functions including CreateDesktop, OpenDesktop and SwitchDesktop. If it is desirable to run a program on the opened desktop, a CreateProcess function is also necessary.

In the Linux system, the virtual desktop is a method that extend the working area of the user beyond the boundary of the computer display screen, and this desktop can roll up, down, left and right, like a larger desktop being placed behind the glass screen, and it can move around to display icons, windows and some other objects existing in the background or out of sight. At present, Windows XP and Windows 2003 can also realize the virtual desktop just like Linux, and it is only required to download a msvdm.dll file but no program needs to be installed. Windows can provide four desktops altogether, each desktop can have a different background and a corresponding shortcut key applied, but the shortcut icons on these four desktops are always the same, and they cannot represent different programs on different desktops. Thus there is no worry about the generation of the shortcuts when installing software on the virtual desktop.

According to one embodiment of the present invention, an installation script database may be constructed at the server, which stores the names, version numbers of commonly used software and the corresponding installation boot scripts. Correspondingly, referring to FIG. 2, which is a schematic drawing of a flow of steps of detecting by a client according to an embodiment of the present invention. First of all, issuing a list of software names and version numbers stored in the database to the client by the server (step 201); then detecting by the client whether the client has the corresponding software to be installed according to information of said list (step 202); generating a list of softwares to be installed according to the result of detection (step 203).

Detection by the client is not limited to the above-mentioned way, but it may be initiated directly by the client instead of being upon issuing of the list by the server.

FIG. 3 is a schematic drawing of a flow of steps of detecting by a client according to another embodiment of the present invention. First, detecting, by the client, names and version numbers of all softwares to be installed/upgraded in the client and transmitting them to the server (step 301); then, comparing, by the server, the names and version numbers of softwares to be installed/upgraded transmitted from the client with the software names and version numbers stored in the database to determine manageable software names and version numbers (step 302); generating, by the client, a list of softwares to be installed/upgraded according to said manageable software names and version numbers (step 303).

Figure 4:
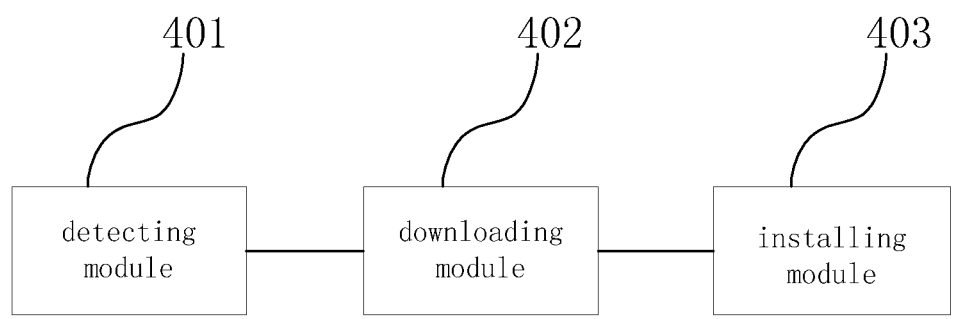
FIG. 4 is a schematic drawing of a system for intelligent installation/upgrading of software according to an embodiment of the present invention.

Referring to FIG. 4, the present invention also provides a system for intelligent installation/upgrading of software, which comprises a detecting module 401, a downloading module 402 and an installing module 403.

Wherein, the detecting module 401 is adapted to detecting, at a client, softwares that have been installed on the client, generating a list of softwares to be installed/upgraded, and providing a corresponding installation/upgrading prompt for each software to be installed/upgraded;

the downloading module 402 is adapted to, upon detecting by the client that a user selects an installation/upgrading operation of a software according to said installation/upgrading prompt, downloading a corresponding target software installation/upgrading package from a server according to a name and version number of said software to be installed/upgraded;

the installing module 403 is adapted to running an installation/upgrading file in said target software installation/upgrading package at the client to finish installation/upgrading of said software.

As mentioned above, the detecting module 401 may perform corresponding detection according to a pre-set software list; said pre-set software list includes software names, when the detecting module detects that said software is not installed on said client, it prompts the user to download and install.

Likewise, said pre-set software list may further include software version numbers, when the detecting module detects that a version number of a corresponding software installed on the client is lower than that in said list, it prompts the user to download the upgraded version.

Correspondingly, FIG. 5 shows a schematic drawing of a detecting module according to an embodiment of the present invention, which comprises an issuing unit 501, a detecting unit 502 and a generating unit 503, wherein, the issuing unit 501 is adapted to issuing a list of software names and version numbers stored in the database to the client from the server;

the detecting unit 502 is adapted to detecting at the client whether said client has the corresponding software to be installed/upgraded according to information of said list;

the generating unit 503 is adapted to generating a list of softwares to be installed/upgraded according to the result of detection of the detecting unit.

FIG. 6 is a schematic drawing of a detecting module according to another embodiment of the present invention, which comprises a detecting unit 601, a comparing unit 602 and a generating unit 603, wherein, the detecting unit 601 is adapted to detecting, at the client, the names and version numbers of all softwares to be installed/upgraded in said client and transmitting them to the server;

the comparing unit 602 is adapted to comparing, at the server, the names and version numbers of software to be installed/upgraded transmitted from the client with the software names and version numbers stored in the database to determine manageable software names and version numbers;

the generating unit 603 is adapted to generating, at the client, a list of softwares to be installed/upgraded according to said manageable software names and version numbers.

Likewise, the installing module in the embodiment of the present invention can perform the installation in a quiesce manner, or it can perform the installation on a virtual desktop by creating a virtual desktop.

Installation on a virtual desktop is one of the special features of the present invention, in cooperation with the above-mentioned installation boot script, it enables the user not to participate in the whole software installation process any more after clicking installation, in the meantime, there is no need to worry about installing any bound contents unintentionally, also, any operation of the user on the present desktop will not be interrupted, and resource of the present desktop will not be occupied, either, thus realizing complete intervention-free green installation.

INDUSTRIAL PRACTICAL APPLICABILITY

The present invention provides a more convenient way of software installation/upgrading, and it effectively avoids installing harmful contents during the installation/upgrading process, besides, it can intelligently, efficiently and accurately detect software installation information, precisely determine the software versions, and push software upgrading information to a user's desktop according to software upgrading frequency of the user.

The invention claimed is:

1. A method for intelligent installation/upgrading of software, characterized in that said method comprising the following steps:

detecting, at a client, softwares that have been installed on the client, generating a list of softwares to be installed/upgraded, and providing a corresponding installation/upgrading prompt for each software to be installed/upgraded;

upon detecting, by the client, that a user selects an installation/upgrading operation of a software according to said installation/upgrading prompt, downloading a corresponding target software installation/upgrading package from a server according to a name and version number of said software to be installed/upgraded;

running an installation/upgrading file in said target software installation/upgrading package at the client to finish installation/upgrading of said software, wherein, the installation/upgrading file of said target software installation/upgrading package includes an installation boot script which shields bound contents from being installed at the client, the installation boot script being prepared based on a simulated installation indicative of avoiding installation of the bound contents so that in the process of executing the script, some steps of requiring the user to click to select for installation are skipped.

2. The method according to claim 1, characterized in that the step of detecting, at a client, softwares that have been installed on the client is performing corresponding detections according to a pre-set software list; said pre-set software list includes software names, and when the client detects that a software is not installed on the client, it prompts the user to download and install said software.

3. The method according to claim 2, characterized in that said pre-set software list further includes software version numbers, when the client detects that a version number of a corresponding software installed on said client is lower than that in said list, it prompts the user to download the upgraded version.

4. The method according to claim 2, characterized in that said pre-set software list is stored in the client or it is stored in the server and updated periodically to be issued to the client.

5. The method according to claim 1, characterized in that said target software installation/upgrading package is a self-made installation/upgrading package shielding bound contents included in an original installation/upgrading package of said software.

6. The method according to claim 1, characterized in that said installation boot script shields bound contents by selecting and setting installation parameters.

7. The method according to claim 1, characterized in that the installation/upgrading file of said target software installation/upgrading package includes an installation boot script which includes a step of deleting specific bound files and/or recovering environment setting modified by said bound files after finishing the installation/upgrading.

8. The method according to claim 1, characterized in that the installation/upgrading file of said target software installation/upgrading package includes an installation boot script which includes a step of replacing or adding upgrading files and/or setting the registration environment.

9. The method according to claim 1, characterized in that the installation/upgrading file of said target software installation/upgrading package includes an installation boot script which includes quiesce installation parameters to perform installation/upgrading in a quiesce mode.

10. The method according to claim 1, characterized in that the installation/upgrading file of said target software installation/upgrading package includes an installation boot script which includes creating a virtual desktop and performing the step of installation/upgrading on the virtual desktop.

11. A system for intelligent installation/upgrading of software, which comprises:
   a memory having instructions stored thereon; and
   a processor configured to execute the instructions to perform following operations for intelligent installation/upgrading of software:
   detecting softwares that have been installed on a client, generating a list of softwares to be installed/upgraded, and providing a corresponding installation/upgrading prompt for each software to be installed/upgraded;
   upon detecting by the client that an installation/upgrading operation of a software is selected according to said installation/upgrading prompt by a user, downloading a corresponding target software installation/upgrading package from a server according to a name and version number of said software to be installed/upgraded;
   running an installation/upgrading file in said target software installation/upgrading package at the client to finish installation/upgrading of said software, wherein, the installation/upgrading file of said target software installation/upgrading package includes an installation boot script which shields bound contents from being installed at the client, the installation boot script being prepared based on a simulated installation indicative of avoiding installation of the bound contents so that, in the process of executing the script, some steps of requiring the user to click to select for installation are skipped.

12. The system according to claim 11, characterized in that the processor detects softwares that have been installed on the client by performing corresponding detection according to a pre-set software list; said pre-set software list includes software names, when the processor detects that said software is not installed on the client, it prompts the user to download and install.

13. The system according to claim 11, characterized in that said pre-set software list further includes software version numbers, when the processor detects that a version number of a corresponding software installed on the client is lower than that in said list, it prompts the user to download the upgraded version.

* * * * *

UNITED STATES PATENT AND TRADEMARK OFFICE
CERTIFICATE OF CORRECTION

| | | |
|---|---|---|
| PATENT NO. | : 9,459,853 B2 | Page 1 of 1 |
| APPLICATION NO. | : 13/885763 | |
| DATED | : October 4, 2016 | |
| INVENTOR(S) | : Sheng Ou and Lixin Wan | |

It is certified that error appears in the above-identified patent and that said Letters Patent is hereby corrected as shown below:

On the Title Page

Item (*), remove "This patent is subject to a terminal disclaimer."

Item (45), replace "Date of Patent: *Oct. 4, 2016" with "Date of Patent: Oct. 4, 2016."

Signed and Sealed this
Twenty-first Day of February, 2017

Michelle K. Lee
*Director of the United States Patent and Trademark Office*